US012754881B2

(12) United States Patent
Cheng et al.

(10) Patent No.: US 12,754,881 B2
(45) Date of Patent: Oct. 6, 2026

(54) TECHNIQUES FOR DETERMINISTICALLY ROUTING DATABASE REQUESTS TO DATABASE SERVERS

(71) Applicant: Apple Inc., Cupertino, CA (US)

(72) Inventors: Hering S. Cheng, South San Francisco, CA (US); Simon J. Gornall, San Jose, CA (US); Quan D. Nguyen, Santa Clara, CA (US); Hung V Tran, Union City, CA (US); Zhongren Xu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/636,121

(22) Filed: Apr. 15, 2024

(65) Prior Publication Data

US 2024/0403262 A1 Dec. 5, 2024

Related U.S. Application Data

(60) Provisional application No. 63/506,052, filed on Jun. 2, 2023.

(51) Int. Cl.
*G06F 16/13* (2019.01)
*G06F 16/16* (2019.01)
(Continued)

(52) U.S. Cl.
CPC ............ *G06F 16/13* (2019.01); *G06F 16/137* (2019.01); *G06F 16/164* (2019.01); *G06F 16/1774* (2019.01); *G06F 16/182* (2019.01); *G06F 21/602* (2013.01); *G06F 21/6218* (2013.01); *G06F 2221/2107* (2013.01)

(58) Field of Classification Search
CPC ...... G06F 16/13; G06F 16/137; G06F 16/164; G06F 16/1774; G06F 16/182; G06F 21/602; G06F 21/6218; G06F 2221/2107; G06F 16/2343; G06F 16/273; G06F 11/1469; G06F 2201/84; G06F 3/0619; G06F 3/065; G06F 3/067; G06F 2212/263
See application file for complete search history.

(56) References Cited

U.S. PATENT DOCUMENTS 8,433,771 B1 4/2013 Ellsworth
9,521,198 B1 12/2016 Agarwala
(Continued)

OTHER PUBLICATIONS

"Django 1.4 documentation", Oct. 11, 2017.*
(Continued)

*Primary Examiner* — Cindy Nguyen
(74) *Attorney, Agent, or Firm* — DICKINSON WRIGHT RLLP

(57) ABSTRACT

The embodiments set forth techniques for managing a plurality of database engines. In particular, a database server can perform the steps of (1) concurrently executing the plurality of database engines, and (2) in response to receiving a request to perform an input/output (I/O) operation to a database file of a plurality of database files: (i) selecting, among the plurality of database engines, a database engine that is available to perform the I/O operation, (ii) performing at least one operation to make the database file accessible to the database engine, and (iii) causing the database engine to perform the I/O operation to the database file.

20 Claims, 14 Drawing Sheets

(51) Int. Cl.

| | |
|---|---|
| ***G06F 16/176*** | (2019.01) |
| ***G06F 16/182*** | (2019.01) |
| ***G06F 21/60*** | (2013.01) |
| ***G06F 21/62*** | (2013.01) |

(56) References Cited

U.S. PATENT DOCUMENTS

| | | | | |
|---|---|---|---|---|
| 10,530,858 | B1 | 1/2020 | Parulkar et al. | |
| 11,514,080 | B1 * | 11/2022 | Angius | G06F 16/23 |
| 2005/0091653 | A1 | 4/2005 | Willehadson et al. | |
| 2009/0037367 | A1 * | 2/2009 | Wein | G06F 9/5061 |
| 2009/0276771 | A1 | 11/2009 | Nickolov et al. | |
| 2012/0047107 | A1 | 2/2012 | Doddavula | |
| 2012/0226673 | A1 * | 9/2012 | Li | G06F 16/951 707/704 |
| 2012/0290536 | A1 | 11/2012 | Kreindler | |
| 2012/0310881 | A1 | 12/2012 | Shadmon | |
| 2016/0323082 | A1 | 11/2016 | Watanabe | |
| 2017/0041296 | A1 | 2/2017 | Ford et al. | |
| 2017/0262638 | A1 | 9/2017 | Horowitz | |
| 2017/0344618 | A1 * | 11/2017 | Horowitz | G06F 16/27 |
| 2019/0087600 | A1 * | 3/2019 | Sion | H04L 9/0861 |
| 2020/0034216 | A1 | 1/2020 | Kolodzieski | |
| 2020/0100106 | A1 * | 3/2020 | Black | H04W 12/06 |
| 2020/0349067 | A1 | 11/2020 | Syamala et al. | |
| 2022/0147422 | A1 | 5/2022 | Ramohalli Gopala Rao et al. | |
| 2023/0020330 | A1 | 1/2023 | Schwerin et al. | |
| 2023/0195747 | A1 * | 6/2023 | Thomsen | G06F 16/24568 707/639 |
| 2023/0376333 | A1 | 11/2023 | Agarwal | |
| 2024/0086520 | A1 | 3/2024 | Kaplan | |
| 2024/0403316 | A1 | 12/2024 | Vrtiska | |

OTHER PUBLICATIONS

U.S. Appl. No. 18/636,079, Final Office Action dated May 7, 2025.

U.S. Appl. No. 18/636,079, Non-Final Office Action dated Aug. 11, 2025.

U.S. Appl. No. 18/636,079, Final Office Action dated Jan. 30, 2026.

* cited by examiner

Step 1 – A client device issues, to a routing server 108-2, a request to perform I/O to a database file associated with a user ID Step 2 – The routing server 108-2 generates, using a hash engine, a hash output of "2", and directs the request to the database server 114-2

Step 3 – The database server 114-2 determines that the database file (122-1) for the user ID is not presently cached

Step 4 – The database server 114-2 interfaces with storage server(s) 120 to (i) update the metadata of the database file 122-1 to indicate that the database server 114-2 has obtained an exclusive lock to the database file 122-1, and (ii) cache the database file 122-1

Step 5 – The database server 114-2 performs I/O operations to the database file 122-1 stored in the cache Step 6 – The database server 114-2 / routing server 108-2 provides an I/O response to the client device

Step 7 – In response to at least one condition being met, the database server 114-2 persists the database file 122-1 to the storage server(s) 120

Step 8 – In response to at least one condition being met, the database server 114-2 uncaches the database file 122-1 from the cache

TECHNIQUES FOR DETERMINISTICALLY ROUTING DATABASE REQUESTS TO DATABASE SERVERS

CROSS-REFERENCE TO RELATED APPLICATIONS

The present application claims the benefit of U.S. Provisional Application No. 63/506,052, entitled "TECHNIQUES FOR DETERMINISTICALLY ROUTING DATABASE REQUESTS TO DATABASE SERVERS," filed Jun. 2, 2023, the content of which is incorporated by reference herein in its entirety for all purposes.

FIELD

The described embodiments relate generally to database management and routing techniques. More particularly, the described embodiments provide techniques for selecting database servers to process input/output (I/O) requests, techniques for managing database files for a plurality of users, and techniques for managing a plurality of database engines.

BACKGROUND

Implementing a database center that handles the ever-increasing size and speed expectations of users presents numerous challenges for organizations. As data continues to grow at an unprecedented rate—and users demand faster access and real-time insights—database administrators face significant obstacles in managing and optimizing their systems effectively.

One of the key challenges is scalability, such as vertical scaling, which involves adding more resources to a single server, and horizontal scaling, which involves distributing the data across multiple servers. Another challenge is ensuring that efficient data storage and retrieval metrics remain intact. With large amounts of data, the organization must employ effective data management strategies. This involves optimizing data storage methods, such as compression techniques or data partitioning, which can reduce storage costs and improve query performance.

Satisfying the increasing speed expectations of users is another significant challenge. As users demand real-time or near real-time access to data, the database center must be able to handle high transaction rates and provide quick response times. This requires optimizing database configurations, improving network infrastructure, and utilizing caching mechanisms to minimize latency. Ensuring efficient query execution and reducing processing overhead becomes critical in meeting such speed expectations.

Security is also a major concern. With the growth of data and the increasing reliance on databases, protecting sensitive information from unauthorized access or data breaches has become important. Database administrators must implement robust security measures, such as encryption, access controls, and auditing, to safeguard the data. Keeping up with evolving security threats and implementing appropriate security patches and updates is an ongoing challenge.

Lastly, managing the complexity of diverse database technologies poses its own set of challenges. Organizations often implement a mix of database systems, such as relational databases, NoSQL databases, and data warehouses, which each have their own unique requirements and configurations. Coordinating and integrating these systems to ensure seamless data flow and interoperability can be complex and time-consuming.

Accordingly, there exists a need for techniques that help satisfy the ever-increasing size and speed expectations of databases.

SUMMARY

The described embodiments relate generally to database management and routing techniques. More particularly, the described embodiments provide techniques for selecting database servers to process input/output (I/O) requests, techniques for managing database files for a plurality of users, and techniques for managing a plurality of database engines.

One embodiment sets forth a method for selecting database servers to process input/output (I/O) requests. According to some embodiments, the method can be implemented by a routing server, and includes the steps of (1) receiving, from a client device, a request to perform an I/O operation to a database file that corresponds to a user account, (2) referencing a configuration file to identify a group of database servers through which access to the database file can be achieved, (3) providing, to a hash function, (i) the user account, and (ii) a count of the group of database servers, to produce a hash value that corresponds to a particular database server within the group of database servers, and (4) in response to determining that the particular database server is accessible: providing the request to the particular database server.

Another embodiment sets forth a method for managing database files for a plurality of users. According to some embodiments, the method can be implemented by a database server, and includes the steps of (1) receiving, from a routing server, a request to perform an input/output (I/O) operation to a database file, (2) identifying a storage server through which the database file can be accessed, (3) interfacing with the storage server to obtain an exclusive lock on the database file, and (4) in response to determining that the exclusive lock is obtained: writing, to metadata associated with the database file, information associated with the database server, and performing the I/O operation to the database file.

Yet another embodiment sets forth a method for managing a plurality of database engines. According to some embodiments, the method can be implemented by a database server, and includes the steps of (1) concurrently executing the plurality of database engines, and (2) in response to receiving a request to perform an input/output (I/O) operation to a database file of a plurality of database files: selecting, among the plurality of database engines, a database engine that is available to perform the I/O operation, performing at least one operation to make the database file accessible to the database engine, and causing the database engine to perform the I/O operation to the database file.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description, and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments relate generally to database management and routing techniques. More particularly, the described embodiments provide techniques for selecting database servers to process input/output (I/O) requests, techniques for managing database files for a plurality of users, and techniques for managing a plurality of database engines.

A more detailed discussion of these techniques is set forth below and described in conjunction with FIGS. 1, 2, 3A-3H, and 4-7, which illustrate detailed diagrams of systems and methods that can be used to implement these techniques.

Figure 1:
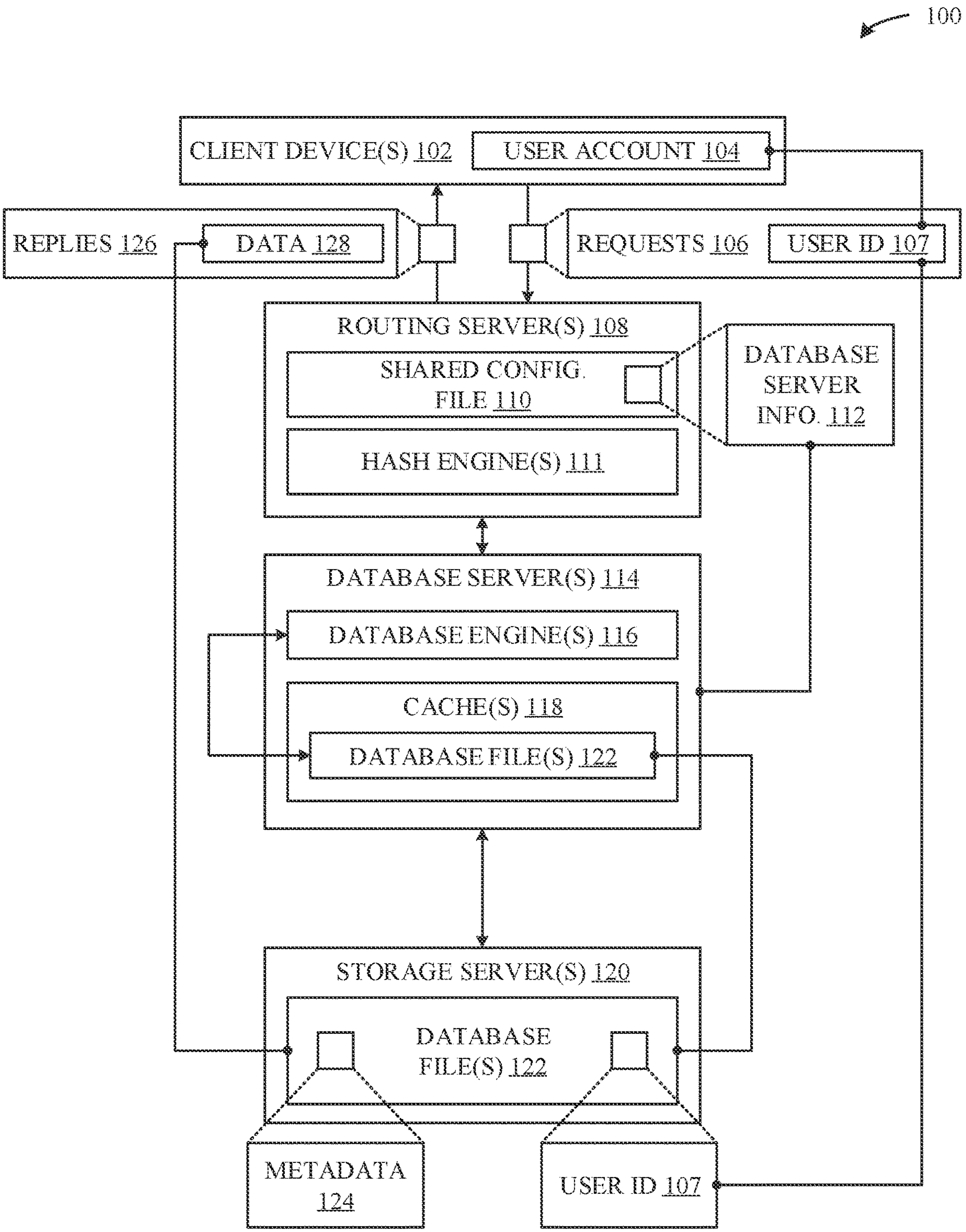
FIG. 1 illustrates a system diagram of a computing device that can be configured to perform the various techniques described herein, according to some embodiments.

FIG. 1 illustrates a block diagram of different components of a system 100 that can be configured to implement the various techniques described herein, according to some embodiments. As shown in FIG. 1, the system 100 can include one or more client devices 102, one or more routing servers 108, one or more database servers 114, and one or more storage servers 120. According to some embodiments, each client device 102 can be associated with (i.e., logged into) a user account 104. For example, to perform a login procedure, the client device 102 can provide a user ID 107 and a corresponding password of the user account 104 to a server device (e.g., another server device not illustrated in FIG. 1) that manages the user account 104. When the server device authenticates the user ID 107/corresponding password, the server device can take appropriate actions to complete the login process. For example, the server device can provide encryption keys, session keys, credentials, tokens, etc., to the client device 102 to complete the client-side login to the user account. Moreover, the server device can complete the server-side login to the user account by establishing/updating records that effectively indicate the client device 102 is logged in to the user account 104. In turn, the successful login can enable the client device 102 to access various services provided by the server device and/or other associated server devices, such as the various database-related services implemented by the routing servers 108, the database servers 114, and the storage servers 120 described herein.

According to some embodiments, and as shown in FIG. 1, each routing server 108 can be configured to receive I/O requests 106 from client devices 102 and route such I/O requests 106 to the database servers 114. According to some embodiments, the routing servers 108 can receive I/O requests 106 from client devices 102 using a variety of organizational approaches. For example, the I/O requests 106 can be routed to the routing servers 108 based on geographical proximities between the client devices 102 and the routing servers 108. In another example, the I/O requests 106 can be routed to the routing servers 108 based on the types of the client devices 102. In yet another example, the I/O requests 106 can be routed to the routing servers 108 based on the user accounts 104 that are associated with the client devices 102. In yet another example, the I/O requests 106 can be routed to the routing servers 108 based on the types of the I/O requests 106. It is noted that the foregoing examples are not meant to be limiting, and that the I/O requests 106 can be routed to the routing servers 108 using any organizational approach without departing from the scope of this disclosure.

According to some embodiments, each I/O request 106 can include a user ID 107 (which, as described herein, ultimately enables the appropriate database file(s) 122 to be accessed to effectively execute the I/O request 106), information about one or more I/O operations to be performed (e.g., reads, writes, etc.), and so on. According to some embodiments, each routing server 108 can access a shared configuration file 110 that includes database server information 112, which can indicate, for example, the number of database servers 114 that are online, their respective capabilities, their respective locations, their respective statuses, their respective internet protocol (IP) addresses, and so on. According to some embodiments, the routing servers 108 can be configured to update the shared configuration file 110 based on activities that are detected in association with the database servers 114. For example, the database server information 112 can be updated to reflect database servers 114 that come online, go offline, and so on. It is noted that any approach can be implemented to effectively enable the routing servers 108 to maintain/access the shared configuration file 110. For example, the routing servers 108 can communicate directly/indirectly with one another, concurrently read from/write to the shared configuration file 110, maintain version, timing, etc. information for the shared configuration file 110, and so on. In this manner, each routing server 108 can utilize the shared configuration file 110 to identify appropriate database servers 114 to which I/O requests 106 should be routed. It is additionally noted that the shared configuration file 110 (and/or other files) can be utilized to store additional information, at any level of granularity, that enables additional functionalities to be implemented. Such additional information can include, for example, information that enables memory/storage-related configurations to be implemented among the database servers 114, database configurations to be implemented among the database servers 114, and so on. It is additionally noted that other approaches that provide the same or similar features to those achieved through the utilization of the shared configuration file 110 (as described herein) can be implemented without departing from the scope of this disclosure.

As described in greater detail herein, each routing server 108 can be configured to execute one or more hash engines 111. According to some embodiments, each hash engine 111 can implement a consistent hashing algorithm—such as a jump hash function—in order to effectively map I/O requests 106 to database servers 114 in a deterministic manner. For example, the routing server 108 can extract the user ID 107 from an I/O request 106, and then provide, to a hash engine 111, (i) the user ID 107, and (ii) a count of available database servers 114 (e.g., as indicated in the database server information 112), to produce a hash output that corresponds to a unique one of the database servers 114. Prior to routing the I/O request 106 to the identified database server 114, the routing server 108 can first check to determine whether the identified database server 114 is online and available. In the event that the identified database server 114 is available, the routing server 108 can route the request to the identified database server 114 to provoke the identified database server 114 to carry out the I/O request 106. In the event that the identified database server 114 is not available, the routing server 108 can select a different database server 114 (e.g., in a sequential manner, a random manner, a deterministic manner, etc.), and then attempt to route the I/O request 106 to the different database server 114. This contingency process can continue until an available database server 114 is identified. It is noted that the foregoing examples are not meant to be limiting, and that any hash function (or other mapping algorithms) can be utilized to map I/O requests 106 to database servers 114 without departing from the scope of this disclosure.

According to some embodiments, the database-related services described herein can enable the client devices 102 to interact with data that is associated with user accounts 104 and is stored within the storage servers 120. For example, the data can include email data, message data, document data, photo/video data, application data, backup data, etc., that is provided by the client devices 102, that is received from other devices and directed to the user accounts 104 of the client devices 102, and so on. According to some embodiments, the storage servers 120 can manage database files 122 that correspond to the user accounts 104 and that are capable of storing the data described herein. For example, each database file 122 can represent a binary file that enables database operations (e.g., reads, writes, overwrites, deletions, etc.) to be asserted against data stored within the binary file. For example, a given database file 122 can represent the complete state of a SQLite database (often referred to as a "main database file"). It is noted that the embodiments are not limited to SQLite implementations. For example, standalone databases such as MySQL and Postgres, as well as embedded databases such as BerkeleyDB and RocksDB, can be utilized to implement the embodiments, without departing from the scope of this disclosure.

As shown in FIG. 1, each database file 122 can be associated with metadata 124, which, as described in greater detail herein, can be used to store information about the database server 114 that is currently accessing the database file 122 (referred to herein as an "exclusive lock"). According to some embodiments, the metadata 124 can be stored within the database file 122, stored separately from the database file 122, and so on. Additionally, each database file 122 can be associated with at least a user ID 107 that effectively associates the database file 122 with a particular user account 104. For example, the database file 122 can be named based on the user ID 107, the type of data stored within the database file 122, and/or any other relevant information. In another example, the database file 122 can store the user ID 107 in the metadata 124, in another file associated with the database file 122, and so on.

Additionally, each database file 122 can be associated with respective journal information that can be used to ensure data durability and recoverability when failure scenarios occur. In particular—and, as described in greater detail below—database engines 116 can be configured to write information about each I/O operation into the journal information before the I/O operation is applied to the database file 122. In this regard, the journal information effectively maintains one or more logs that include a record of all changes that have been made (or were attempted to be made) to the database file 122. In this manner, in case of system failure or data corruption, the journal information can be used to restore the database file 122 to a consistent/current state by replaying the logged/incomplete I/O operations.

According to some embodiments, a one-to-one relationship can exist between the user accounts 104 and the database files 122, such that each user account 104 is associated with a single/respective database file 122. Notably, such an approach can simplify the association between a given database file 122 and a given user account 104, e.g., a filename of the database file 122 can be named based on the user ID 107 (of the user account 104). This approach can beneficially enable a simple mapping to be performed when attempting to look up the database file 122 that corresponds to a given user account 104. However, compared to the one-to-many approach described below, the one-to-one approach can lead to storing an increased amount of data within the database files 122—and can also involve data delineation complexities—which may increase latency when interacting with the database files 122.

In another example approach, a one-to-many relationship can exist between the user accounts 104 and the database files 122, such that each user account 104 is associated with multiple/respective database files 122. Under this approach, any number of database files 122 can be utilized to effectively delineate different types of data associated with a given user account 104. For example, one database file 122 can be used to store email data associated with a given user account 104, another database file 122 can be used to store message data associated with the user account 104, and so on. Notably, the one-to-many approach can require additional information to effectively associate a given user account 104 with its corresponding database files 122. For example, a filename of a given database file 122 can be named based (1) on the user ID 107 (of the user account 104 associated with the database file 122), and (2) a unique identifier of the type of data that is stored by the database file 122. However, compared to the one-to-one approach described above, the one-to-many approach inherently leads to storing less data within the database files 122, which may decrease latency when interacting with the database files 122.

As a brief aside, it is noted that various encryption-related benefits can be achieved through the implementation of the techniques described herein. For example, each database file 122 can be encrypted in whole, in part, etc., using encryption keys that correspond to the user account 104 (that corresponds to the database file 122). This approach contrasts with the conventional approach of utilizing global encryption keys for encrypting large databases that store data for multiple users, which can lead to security and latency issues. This approach also contrasts with the conventional approach of encrypting individual database rows (or groups of database rows) with encryption keys, which necessitates the need to carry out cryptographic operations each time I/O operations are performed. In contrast, the embodiments can enable, for example, a database server 114/database engine 116 that is seeking to access an encrypted database file 122 to first decrypt the database file 122 (e.g., using an encryption key that is provided in conjunction with a I/O request 106) to produce a decrypted database file 122. In turn, the database engine 116 can perform I/O operations (based on the I/O request 106) against the decrypted database file 122 and provide replies 126/data 128 to the client device 102 that issued the I/O request 106. When I/O access to the decrypted database file 122 is no longer required, the database server 114/database engine 116 can re-encrypt the database file 122 to produce an encrypted database file 122 (and, if caching approaches are implemented, persist the encrypted database file 122 back to the storage servers 120). In this manner, more simplified cryptographic mechanisms can be employed while maintaining a high level of security.

According to some embodiments, the storage servers 120 can be configured to carry out storage-related tasks that are tied to the management of the database files 122. Such storage-related tasks can involve, for example, servicing I/O operations that are issued by the database servers 114 and that pertain to the database files 122. The storage related-tasks can also include establishing/maintaining redundancies among the database files 122, which can involve managing parity information associated with the database files 122, distributing backups/copies of database files 122 to different storage servers 120 (and/or other storage devices), and so on. It is noted that the foregoing examples are not meant to be limiting, and that any number of storage servers 120 can be implemented to provide high-availability access to the database files 122 and to effectively handle I/O operations asserted against the database files 122. Such I/O operations can be issued by the database servers 114 in conjunction receiving I/O requests 106 from the client devices 102. For example, the I/O operations can pertain to the creation, modification, and deletion of the database files 122 (themselves), as well as the creation, modification, and deletion of data stored within the database files 122.

According to some embodiments, and as shown in FIG. 1, each database server 114 can be configured to execute one or more database engines 116. Under the SQLite-based approach described above, for example, a given database engine 116 can represent an instance of a SQLite engine that is capable of performing I/O operations to database files 122 (that are formatted in accordance with SQLite-based approaches). According to some embodiments, the database server 114 can be configured to invoke, manage, and terminate database engines 116 based on the capabilities (e.g., hardware, software, etc.) of the database server 114, the number of I/O requests 106 being received by the database server 114, and so on. For example, the database server 114 can, upon the successful completion of a bootup sequence, invoke (i.e., begin executing) one or more database engines 116. In turn, the database server 114 can scale (i.e., increase/decrease) the number of database engines 116 so that the database server 114 can process incoming I/O requests 106 with acceptable turnaround time. Further, the database server 114 can, upon the determination that the overall utilization levels of one or more database engines 116 are not satisfying a threshold, terminate the one or more database engines 116. It is noted that the foregoing examples are not meant to be limiting, and that the database servers 114 can be configured to manage the database engines 116 in any manner that is effective to implement the embodiments described herein.

According to some embodiments, and as shown in FIG. 1, each database server 114 can be configured to implement one or more caches 118. According to some embodiments, each cache 118 can be configured to store one or more database files 122 to improve the overall efficiency by which I/O operations can be executed against the database files 122. For example, when a given database server 114 receives an I/O request 106 that is directed to a given database file 122, the database server 114 can be configured to determine whether the database file 122 is stored in the cache(s) 118. If the database file 122 is stored in the cache 118, then the database server 114 can simply interface with a database engine 116 to execute I/O operations against the database file 122 (stored in the cache 118). However, if the database file 122 is not stored in the cache 118, then the database server 114 can interface with the storage servers 120 to obtain the database file 122, store the database file 122 into the cache 118, and then interface with the database engine 116 to execute the I/O operations against the database file 122 (stored in the cache 118).

As a brief aside, it is noted that the database server 114 can be configured to forego the caching approaches described herein under certain scenarios. For example, when the database server 114 identifies that the I/O operations will not modify the database file 122 in any manner (e.g., read operations only), the database server 114/database engine 116 can access the database file 122 through the storage servers 120 (using the organizational locking techniques described herein), perform the I/O operations, and then reply to the client device 102 that issued the I/O request 106. It is noted that any approach can be utilized to effectively determine whether to cache the database file 122 prior to performing I/O operations. For example, the database server 114/database engine 116 can utilize machine learning approaches to determine, based on the I/O request 106 itself, the historical behavior associated with the client device 102/user account 104, and so on, whether the it would be efficient to cache the database file 122 into the cache 118 in conjunction with performing I/O operations to the database file 122.

According to some embodiments, the database engines 116 can be configured to persist a given database file 122 (stored in the cache 118) to the storage server(s) 120 that manage the database file 122. In particular, the database engine 116 can be configured to identify changes that have been made to the database file 122 (since it was stored into the cache 118) and to transmit information that enables the storage server(s) 120 to reflect the changes to the database file 122 managed by the storage server(s) 120. According to some embodiments, the database engines 116 can persist a given database file 122 in response to one or more conditions being satisfied. For example, the database engines 116 can be configured to persist the database file 122 in response to (1) determining a threshold quantity of I/O requests have been executed against the database file 122, (2) determining a threshold amount of time has passed (e.g., relative to a last time the database file 122 was persisted, relative to a periodic persistence schedule, etc.), (3) identifying that a logoff condition associated with the client device 102/user account 104 has occurred, (4) determining that available network bandwidth has satisfied a threshold, (5) determining that the database server 114 (on which the database engines 116 are executing) will be shutting down, and so on. The database engines 116 can also be configured to evict (i.e., remove) a given database file 122 from the cache(s) 118 in response to one or more of the foregoing (and/or other) conditions being satisfied. It is noted that the foregoing examples are not meant to be limiting, and that any number, type, etc., of conditions can be implemented to persist and/or evict the cached database files 122, without departing from the scope of this disclosure.

According to some embodiments, when a database engine 116 of a database server 114 completes an I/O request 106, the database server 114 can generate a reply 126 that includes data 128. For example, when the I/O request 106 includes at least one read operation, the data 128 can include binary data that is extracted from one or more database files 122 based on the I/O request 106. In another example, when the I/O request 106 includes at least one write operation, the data 128 can include information about whether the at least one write operation was successful, whether an error occurred, and so on. In any case, the database server 114 can route the reply 126 to the routing server 108 from which the I/O request 106 was originally received. In turn, the routing server 108 can route the reply to the client device 102 from which the I/O request 106 was originally generated.

As a brief aside, it is noted that the embodiments described herein primarily involve database-oriented implementations (i.e., database servers, database engines, database operations, database files, etc.) in the interest of simplifying this disclosure. However, the same (or similar) techniques can be implemented using non-database-oriented implementations without departing from the scope of this disclosure. For example, software engines capable of writing to/from data files (e.g., using proprietary approaches, standardized approaches, etc.) can be implemented in lieu of the database engines 116/database files 122, respectively, without departing from the scope of this disclosure. Additionally, the utilization of the caches 118 described herein is not meant to be limiting. For example, the database engines 116 can be configured to forego the caching techniques described herein and instead directly interact with the database files 122 (e.g., using Network File System protocols) without departing from the scope of this disclosure.

It should be understood that the various components of the computing devices illustrated in FIG. 1 are presented at a high level in the interest of simplification. For example, although not illustrated in FIG. 1, it should be appreciated that the various computing devices can include common hardware/software components that enable the above-described software entities to be implemented. For example, each of the computing devices can include one or more processors that, in conjunction with one or more volatile memories (e.g., a dynamic random-access memory (DRAM)) and one or more storage devices (e.g., hard drives, solid-state drives (SSDs), etc.), enable the various software entities described herein to be executed. Moreover, each of the computing devices can include communications components that enable the computing devices to transmit information between one another.

A more detailed explanation of these hardware components is provided below in conjunction with FIG. 6. It should additionally be understood that the computing devices can include additional entities that enable the implementation of the various techniques described herein without departing from the scope of this disclosure. It should additionally be understood that the entities described herein can be combined or split into additional entities without departing from the scope of this disclosure. It should further be understood that the various entities described herein can be implemented using software-based or hardware-based approaches without departing from the scope of this disclosure.

Accordingly, FIG. 1 provides an overview of the manner in which the system 100 can implement the various techniques described herein, according to some embodiments. A more detailed breakdown of the manner in which these techniques can be implemented will now be provided below in conjunction with FIGS. 2, 3A-3H, and 4-6.

Figure 2:
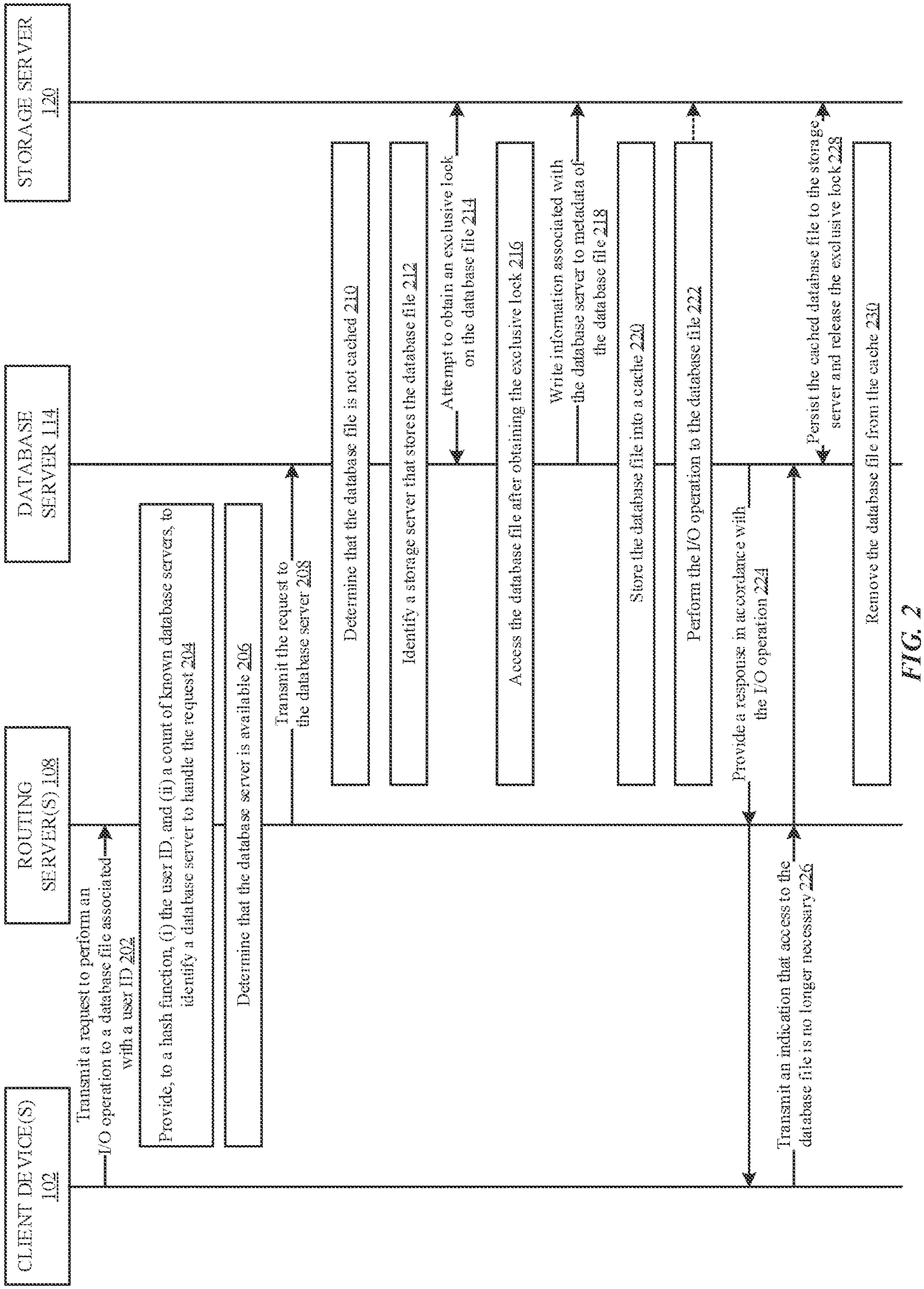
FIG. 2 illustrates a sequence diagram of techniques for selecting database servers to process I/O requests, techniques for managing database files for a plurality of users, according to some embodiments, and techniques for managing a plurality of database engines.

FIG. 2 illustrates a sequence diagram of techniques for selecting database servers 114 to process I/O requests 106, as well as techniques for managing database files 122 for a plurality of users, according to some embodiments. As shown in FIG. 2, the sequence diagram begins at step 202, where a client device 102 transmits, to a routing server 108, an I/O request 106 to perform an I/O operation to a database file 122 associated with user ID 107 (e.g., as described above in conjunction with FIG. 1). For example, the I/O request 106 can include an email address (e.g., "user@domain.com") associated with the user account 104, one or more credentials that prove the client device 102 is logged in to the user account, and a request to access all emails in an inbox folder for the email address.

At step 204, the routing server 108 provides, to a hash engine 111, (i) the user ID 107, and (ii) a count of known database servers 114, to identify a database server 114 to handle the request (e.g., as also described above in conjunction with FIG. 1). Continuing with the foregoing example—and, assuming that there are ten active database servers 114 to which the routing server 108 can potentially route the I/O request 106—this step can involve the hash function receiving the inputs "user@domain.com" and "10", and outputting an index, name, etc. that corresponds to one of the ten database servers 114. For example, the output of the hash function can be "5", which corresponds to a fifth one of the ten database servers 114 (e.g., a database server 114-5).

At step 206, the routing server 108 determines whether the database server 114-5 is available (e.g., as also described above in conjunction with FIG. 1). This step can involve, for example, accessing the database server information 112 to identify any status changes for the database server 114-5 that have taken place since the I/O request 106 was received. This step can also involve interfacing directly with the database server 114-5 to determine whether it is functioning/capable of handling the I/O request 106. For example, the routing server 108 can query the database server 114 for a simple response to determine whether the database server 114 is online, can verify that the communication path to the database server 114 is not constrained by network traffic, and so on. In response to determining that the database server

114-5 is available, the routing server 108, at step 208, transmits the I/O request 106 to the database server 114-5.

At step 210, the database server 114-5 determines whether the database file 122 is cached in a cache 118 that is accessible to the database server 114-5 (e.g., as also described above in conjunction with FIG. 1). This can involve, for example, parsing the database files 122 included in the cache 118 to determine whether any of the database files 122 correspond to the user ID 107. If the database server 114-5 determines that the database file 122 is in the cache 118, then steps 212-220 are omitted and step 222 is performed. Otherwise, if the database server 114-5 determines that the database file 122 is not in the cache 118, then the database server 114-5 implements steps 212-220 to properly obtain and cache the database file 122.

At step 212, the database server 114-5 identifies a storage server 120 that stores the database file 122 (e.g., as also described above in conjunction with FIG. 1). This can involve, for example, querying different storage servers 120 to identify the storage server 120 that stores the database file(s) 122 associated with the user ID 107, referencing mapping information that associates the user IDs 107 to the storage servers 120 (and thereby enables the proper storage server(s) 120 to be identified), and so on. In turn, at step 214, the database server 114-5 attempts to obtain an exclusive lock on the database file 122 (e.g., as also described above in conjunction with FIG. 1). This can involve, for example, accessing the metadata 124 of the database file 122 and determining whether a different database server 114 has already obtained an exclusive lock on the database file 122. For example, the metadata 124 can store information associated with the different database server 114 (e.g., its name, IP address, etc.) to indicate that the different database server 114 has obtained an exclusive lock on the database file 122. If, at step 214, the database server 114-5 obtains the exclusive lock on the database file 122, then the database server 114-5 can proceed to step 216. Otherwise, the database server 114-5 extracts, from the metadata 124, the information about the different database server 114, and then provides it to the routing server 108. In turn, the routing server 108 can provide the I/O request 106 to the different database server 114 for processing.

At step 216, the database server 114-5 accesses the database file 122 after obtaining the exclusive lock (e.g., as also described above in conjunction with FIG. 1). This can involve, for example, opening an I/O channel to the database file 122 so that I/O operations can be issued to the database file 122. At step 218, the database server 114-5 writes information associated with the database server 114-5 to the metadata 124 associated with the database file 122. In this manner, other database servers 114 that attempt to obtain an exclusive lock to the database file 122 will fail, and will subsequently respond to the routing servers 108 with information about the database server 114-5 (according to the approaches discussed above).

At step 220, the database server 114-5 stores the database file 122 into a cache 118 that is accessible to the database server 114-5. At step 222, the database server 114-5 performs I/O operations (specified in the I/O request 106) to the database file 122. As described herein, performing the I/O operations can involve invoking a new database engine 116—or identifying an existing database engine 116 capable of performing the I/O operation—and providing the I/O operation to the database engine 116. In turn, the database engine 116 (and/or the database server 114) can translate the I/O operation into one or more operations that are compatible with the database engine 116/the database file 122. Continuing with the email inbox example (and example SQLite-based approaches) described herein, the one or more operations could be represented by the SQL SELECT statement, e.g., "select * from email_inbox". In turn, when the database engine 116 executes the one or more operations, the database engine 116/database server 114 can provide an appropriate response to the routing server 108/client device 102. The response can include, for example, data returned in response to a read request, an indication of whether a write/delete request was successfully implemented, and so on.

At step 224, the database server 114-5 provides the response to the routing server 108 (e.g., the routing server 108 through which the I/O request 106 was initially transmitted). In turn, the routing server 108 can provide the response to the client device 102.

At step 226, the client device 102 optionally transmits, to the routing server 108, an indication that access to the database file 122 is no longer necessary. This can be useful, for example, to identify conditions where the database file 122 can be proactively uncached, such as when the client device 102 no longer requires access to the email inbox (e.g., when a sign-out to the email account takes place on the client device 102). In turn, the routing server 108 can provide the indication to the database server 114-5 (e.g., using the routing techniques discussed herein). Alternatively, or additionally, the routing server 108 can provide the indication to one or more different database servers 114, which can then provide the indication to the database server 114-5. This can be useful, for example, when the routing server 108 is unable to communicate with the database server 114-5.

At step 228, the database server 114-5 persists the cached database file 122 to the storage server 120 and releases the exclusive lock on the database file 122. As described herein, persisting the cached database file 122 can involve transmitting any information that enables the storage server 120 to update its copy of the database file 122 to match the database file 122 stored in the cache 118. The information can include, for example, a delta of the binary differences between the database files 122, a description of the changes made to the database files 122, and so on. Additionally, releasing the exclusive lock can include carrying out the same metadata 124 access steps described above in conjunction with steps 214-218, and subsequently eliminating any information from the metadata 124 that otherwise indicates the database server 114-5 has an exclusive lock on the database file 122. In turn, at step 230, the database server 114-5 can remove the database file 122 from the cache 118.

Accordingly, FIG. 2 illustrates a sequence diagram of techniques for selecting database servers 114 to process I/O requests 106, as well as techniques for managing database files 122 for a plurality of users, according to some embodiments. Additionally, FIGS. 3A-3H illustrate conceptual diagrams that provide additional context to the sequence diagram of FIG. 2, according to some embodiments.

Figure 3A:
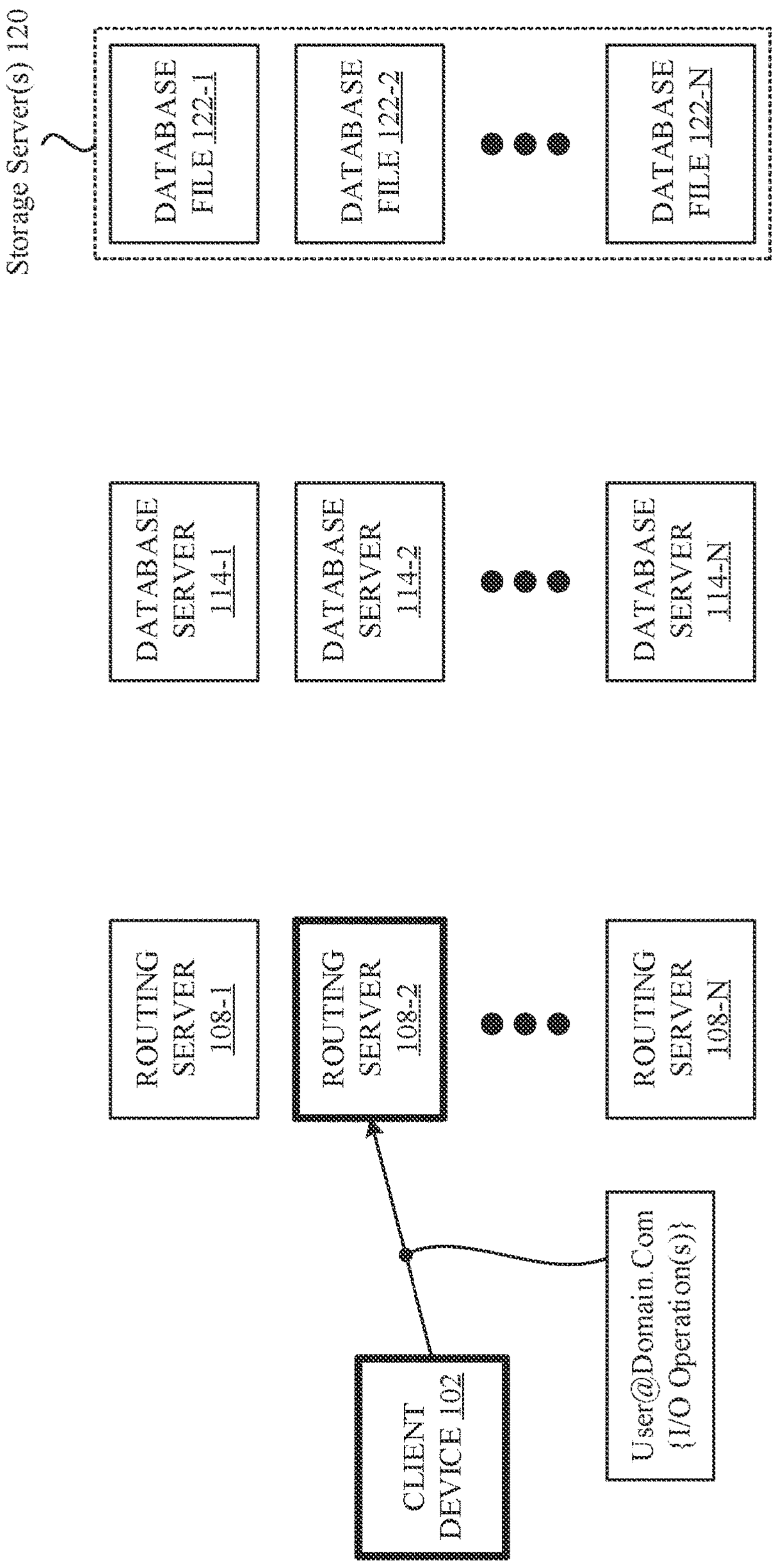
FIGS. 3A-3H illustrate conceptual diagrams that provide additional context to the sequence diagram of FIG. 2, according to some embodiments.

As shown in FIG. 3A, a first step involves a client device 102 issuing, to a routing server 108 (i.e., the routing server 108-2), an I/O request 106 to perform an I/O operation to a database file 122 associated with a user ID 107 (e.g., as described above in conjunction with FIG. 1 and step 202 of FIG. 2). As shown in FIG. 3A, the I/O request 106 specifies that the user ID 107 is "user@domain.com" and specifies at least one I/O operation to be performed.

Figure 3B:
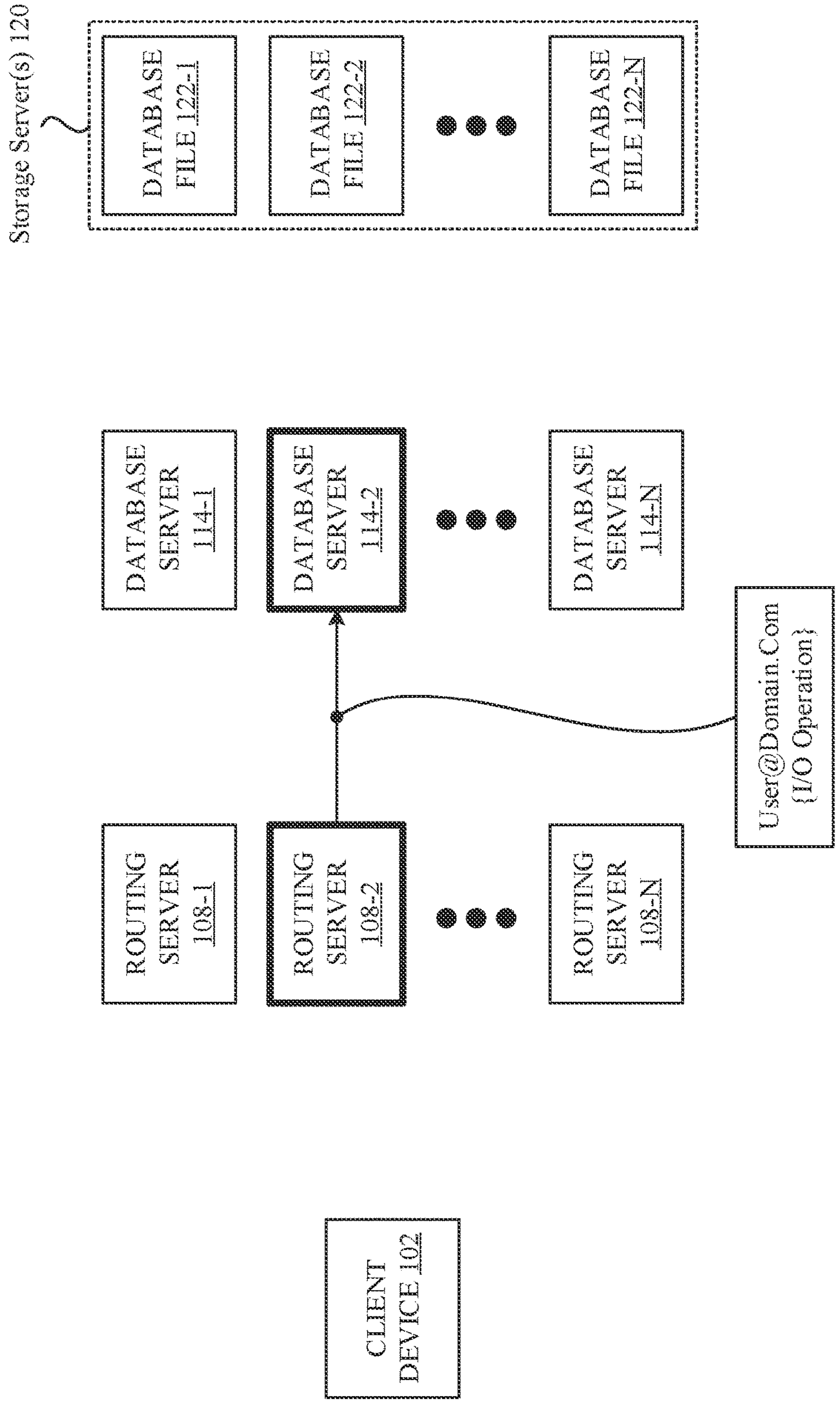

FIG. 3B illustrates a second step that involves the routing server 108-2 generating, using a hash engine 111, a hash output of "2" (e.g., based upon the user ID 107 and the number of available database servers 114, as described above in conjunction with FIG. 1 and step 204 of FIG. 2). In turn, the routing server 108-2 directs the I/O request 106 to the database server 114-2, which corresponds to the hash output of "2".

Figure 3C:
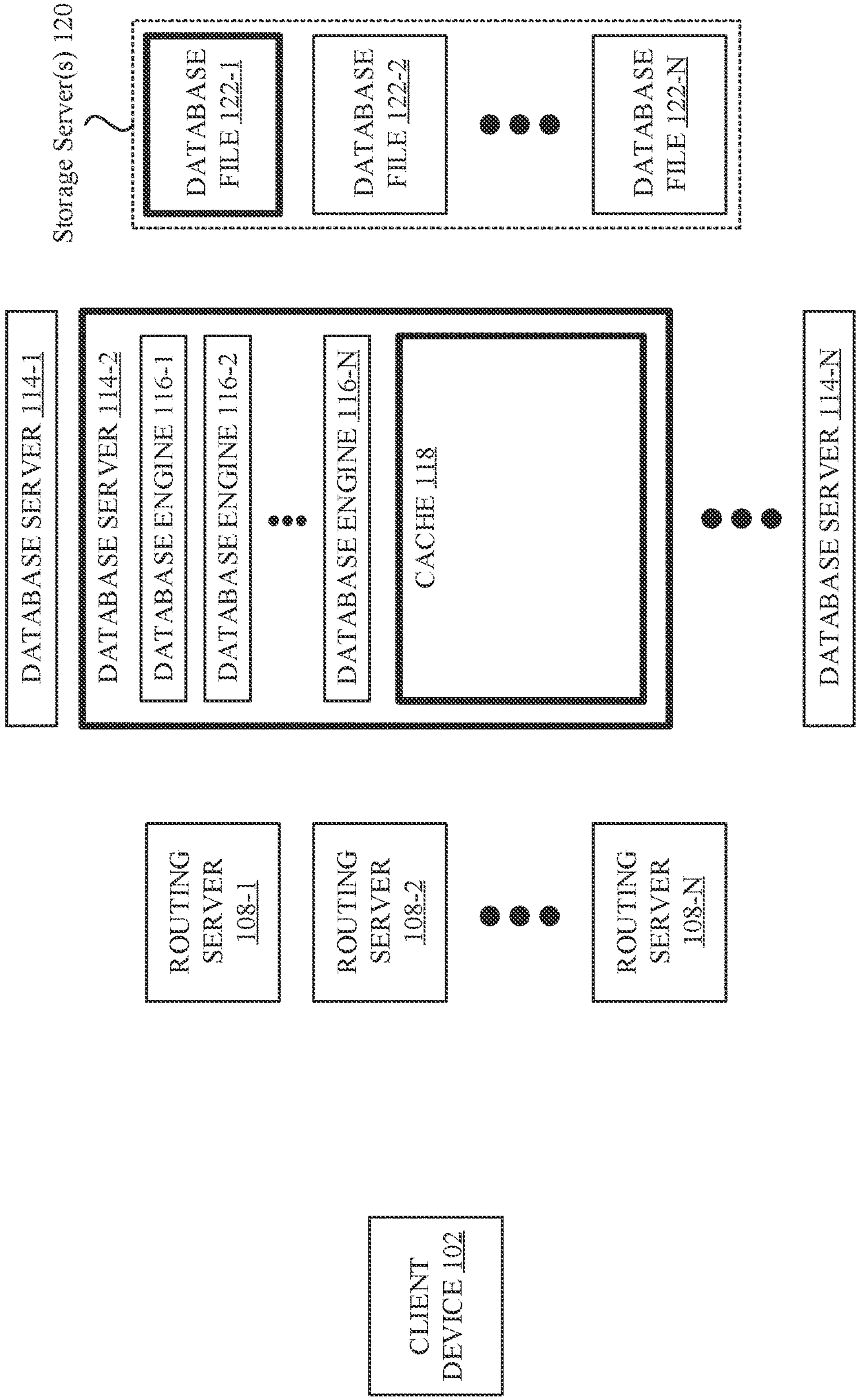

FIG. 3C illustrates a third step that involves the database server 114-2 determining that the database file 122 that corresponds to the user ID 107—which, as shown in FIG. 3C, is the database file 122-1—is not presently stored in the cache 118 of the database server 114-2 (e.g., as described above in conjunction with FIG. 1 and step 210 of FIG. 2). In particular, and as described herein, the database server 114-2 can identify a database file 122 that corresponds to the user ID 107 (i.e., the database file 122-1), and then search the cache 118 to determine whether the database file 122-1 is stored in the cache 118.

Figure 3D:
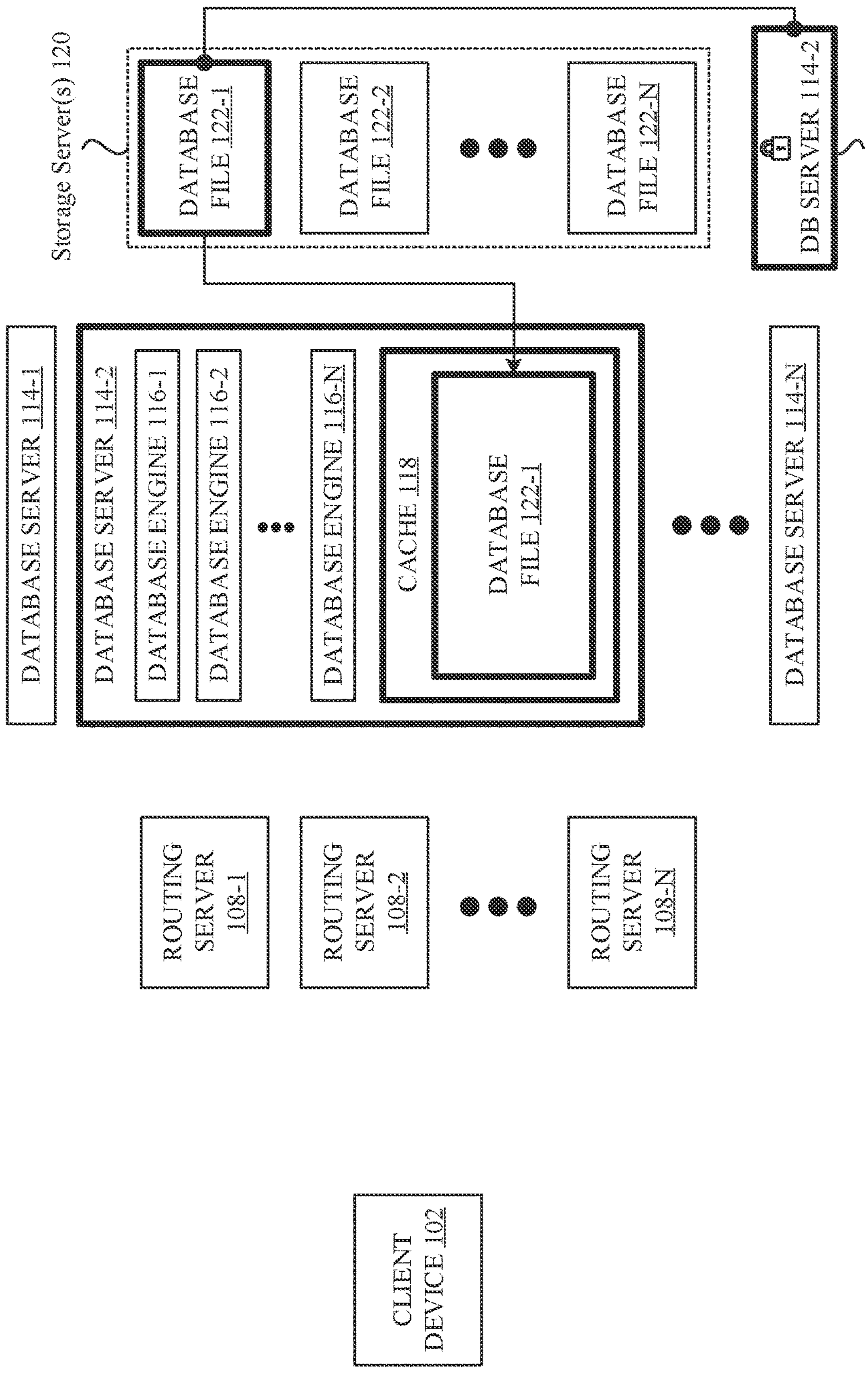

FIG. 3D illustrates a fourth step that involves the database server 114-2 interfacing with one or more storage servers 120 to (i) update the metadata 124 of the database file 122-1 to indicate that the database server 114-2 has obtained an exclusive lock to the database file 122-1, and (ii) cache the database file 122-1 in the cache 118 (e.g., as described above in conjunction with FIG. 1 and steps 212-220 of FIG. 2). This fourth step assumes that no other database servers 114 have obtained an exclusive lock to the database file 122-1 (which, as described herein, can be determined by analyzing the metadata 124).

Figure 3E:
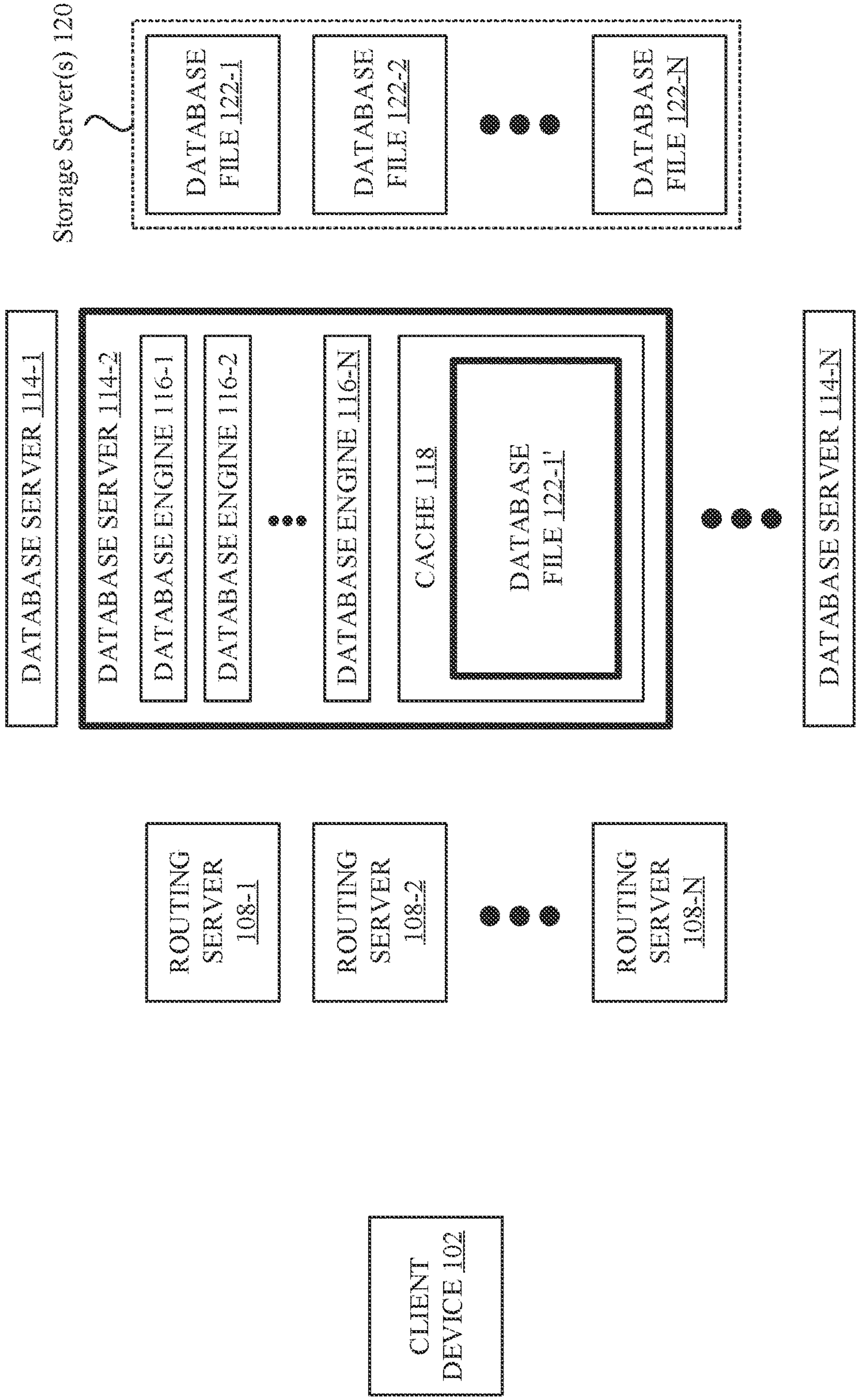

FIG. 3E illustrates a fifth step that involves the database server 114-2 performing I/O operations to the database file 122-1 stored in the cache 118 (e.g., as described above in conjunction with FIG. 1 and step 222 of FIG. 2). As described herein, the database server 114-2 and/or a database engine 116 executing on the database server 114-2 can identify the I/O operations based on the I/O request 106. In turn, then I/O operations, when performed against the database file 122-1 stored in the cache 118, can produce a database file 122-1' that is distinct from the database file 122-1 stored by the storage servers 120. However, it is noted that, in some situations, the I/O operations may not change the database file 122-1 in any manner, such as when the I/O operations only include read operations that do not affect the data stored within the database file 122-1. In such a scenario, the database server 114-2/database engine 116 can mark the database file 122-1 in a manner that prevents the database file 122-1 from being persisted to the storage servers 120 until modifying I/O operations are performed.

Figure 3F:
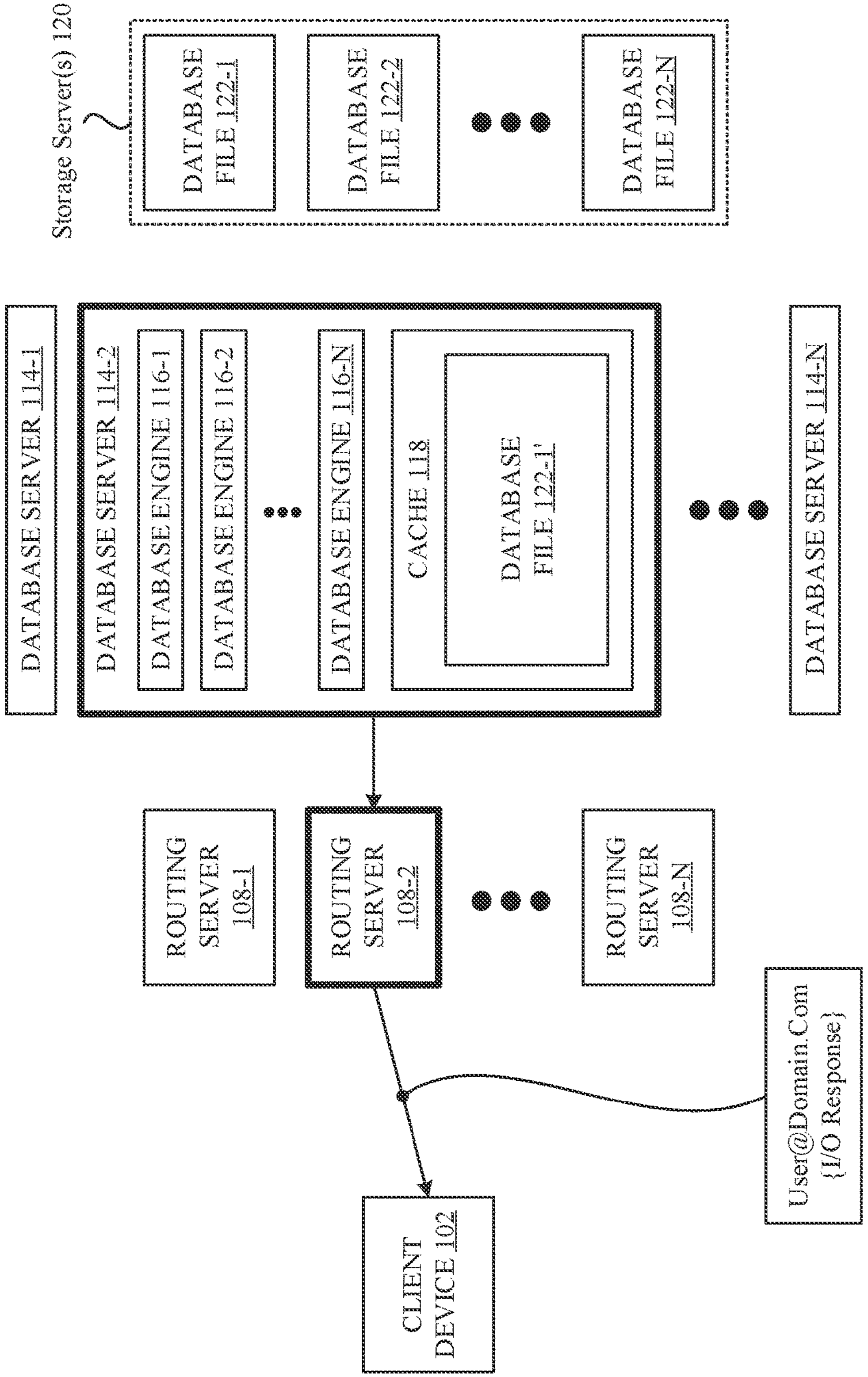

FIG. 3F illustrates a sixth step that involves the database server 114-2/routing server 108-2 sending, to the client device 102, an I/O response (e.g., as described above in conjunction with FIG. 1 and step 224 of FIG. 2). As described herein, the I/O response can be sent as a reply 126 that includes data 128, and the data 128 can store information pertaining to the I/O operations that were carried out (e.g., data read from the database file 122-1, success/failure indications for the I/O operations, etc.).

Figure 3G:
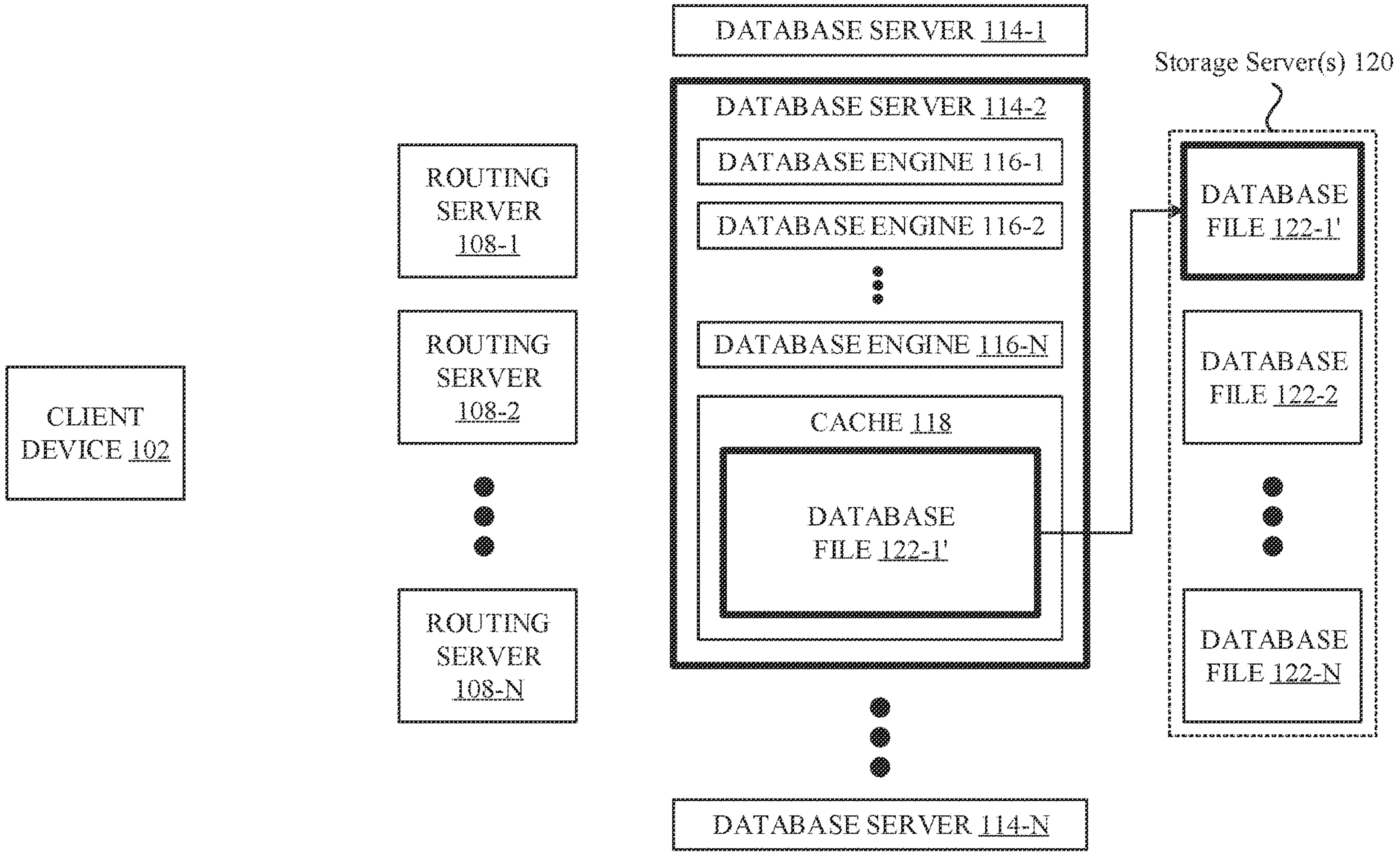
Figure 3H:
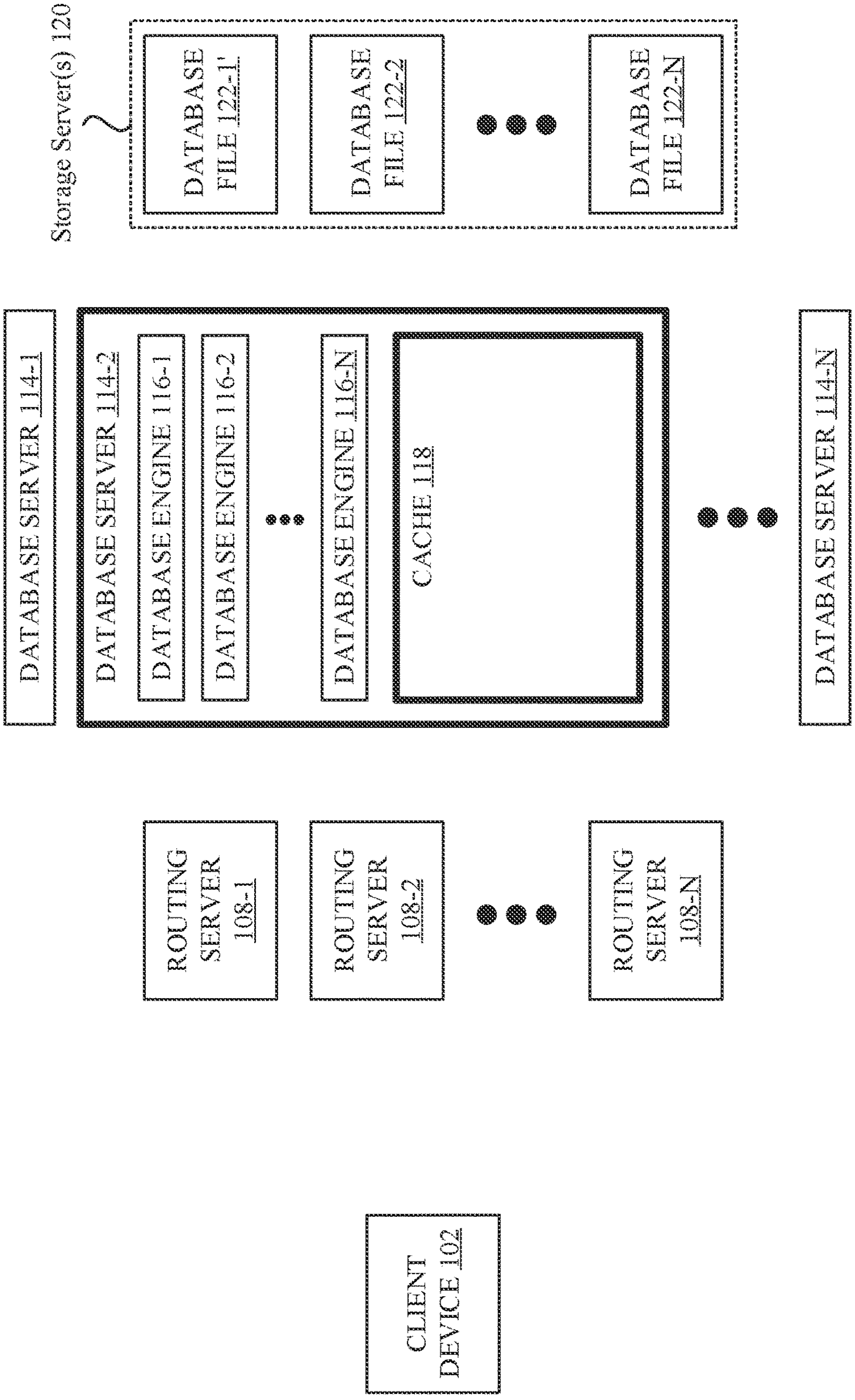

FIG. 3G illustrates a seventh step that involves the database server 114-2 determining that at least one condition has been met, and persisting the database file 122-1 to the storage servers 120 (e.g., as described above in conjunction with FIG. 1 and step 228 of FIG. 2). In turn, FIG. 3H illustrates an eight step that involves the database server 114-2 determining that at least one condition has been met, and uncaching the database file 122-1 from the cache 118 (e.g., as described above in conjunction with FIG. 1 and step 230 of FIG. 2)

Accordingly, FIGS. 3A-3H illustrate conceptual diagrams of the manner in which database servers 114 can be selected to process I/O requests 106, as well as the manner in which database files 122 can be managed for a plurality of users, according to some embodiments. High-level breakdowns of the manners in which the entities discussed in conjunction with FIGS. 1, 2, and 3A-3G can interact with one another will now be provided below in conjunction with FIGS. 4-6.

Figure 4:
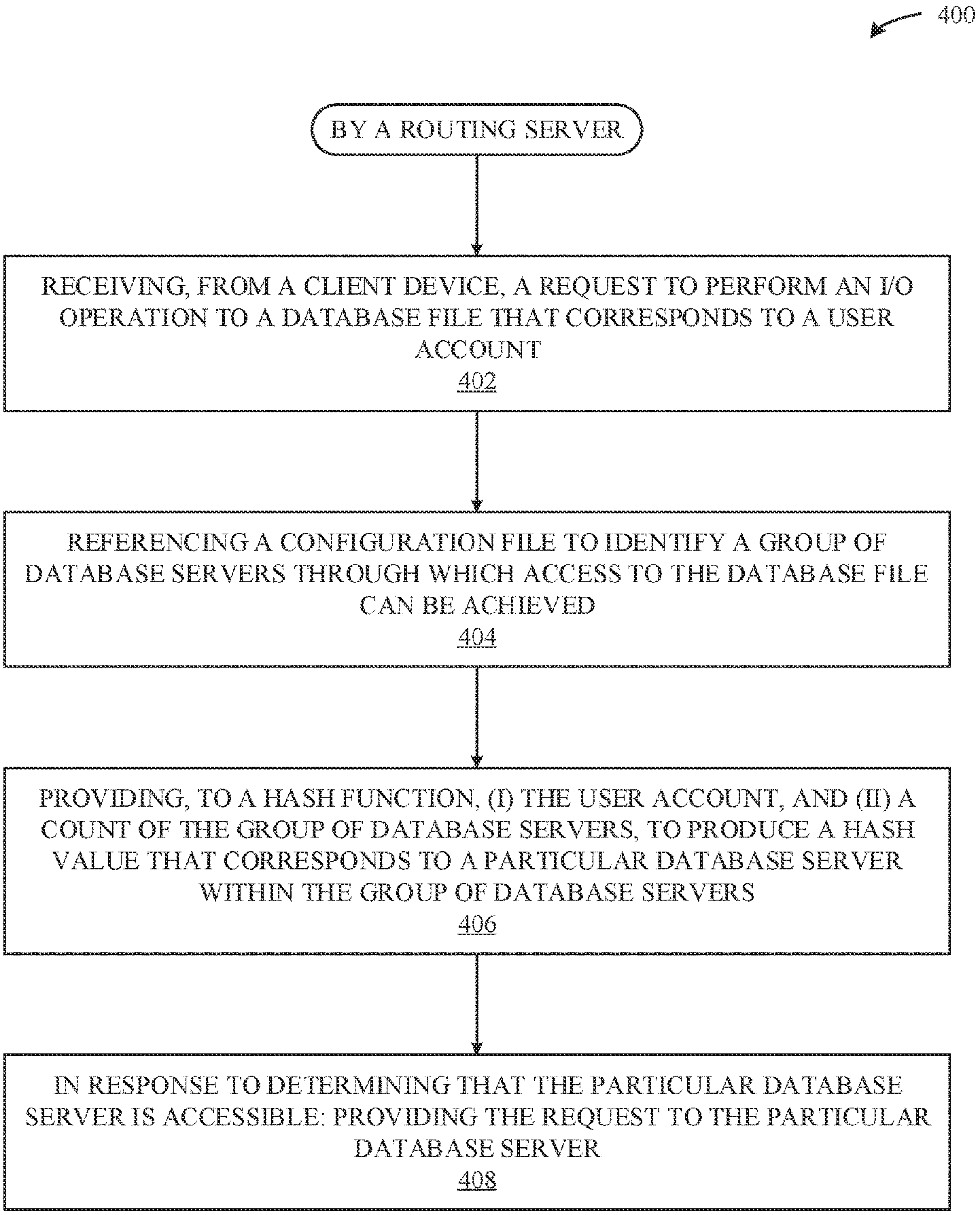
FIG. 4 illustrates a method for selecting database servers to process I/O requests, according to some embodiments.

FIG. 4 illustrates a method 400 for selecting database servers to process I/O requests, according to some embodiments. As shown in FIG. 4, the method 400 begins at step 402, where the routing server 108 receives, from a client device, a request to perform an I/O operation to a database file that corresponds to a user account. At step 404, the routing server 108 references a configuration file to identify a group of database servers through which access to the database file can be achieved. At step 406, the routing server 108 provides, to a hash function, (i) the user account, and (ii) a count of the group of database servers, to produce a hash value that corresponds to a particular database server within the group of database servers. At step 408, the routing server 108, in response to determining that the particular database server is accessible, provides the request to the particular database server.

Figure 5:
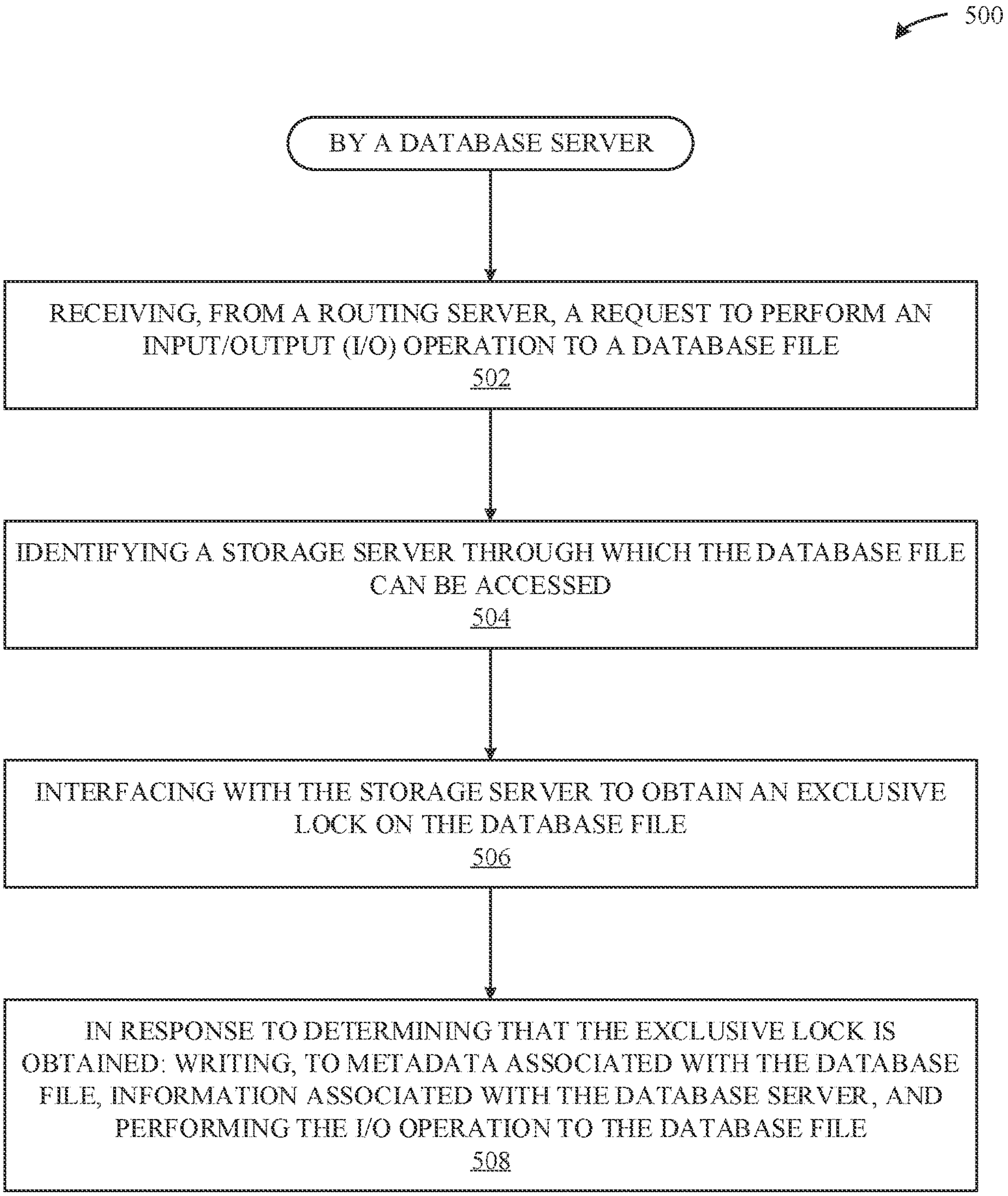
FIG. 5 illustrates a method for managing database files for a plurality of users, according to some embodiments.

FIG. 5 illustrates a method 500 for managing database files for a plurality of users, according to some embodiments. As shown in FIG. 5, the method 500 begins at step 502, where the database server 114 receives, from a routing server, a request to perform an input/output (I/O) operation to a database file. At step 504, the database server 114 identifies a storage server through which the database file can be accessed. At step 506, the database server 114 interfaces with the storage server to obtain an exclusive lock on the database file. At step 508, the database server 114, in response to determining that the exclusive lock is obtained: writing, to metadata associated with the database file, information associated with the database server, and performing the I/O operation to the database file.

Figure 6:
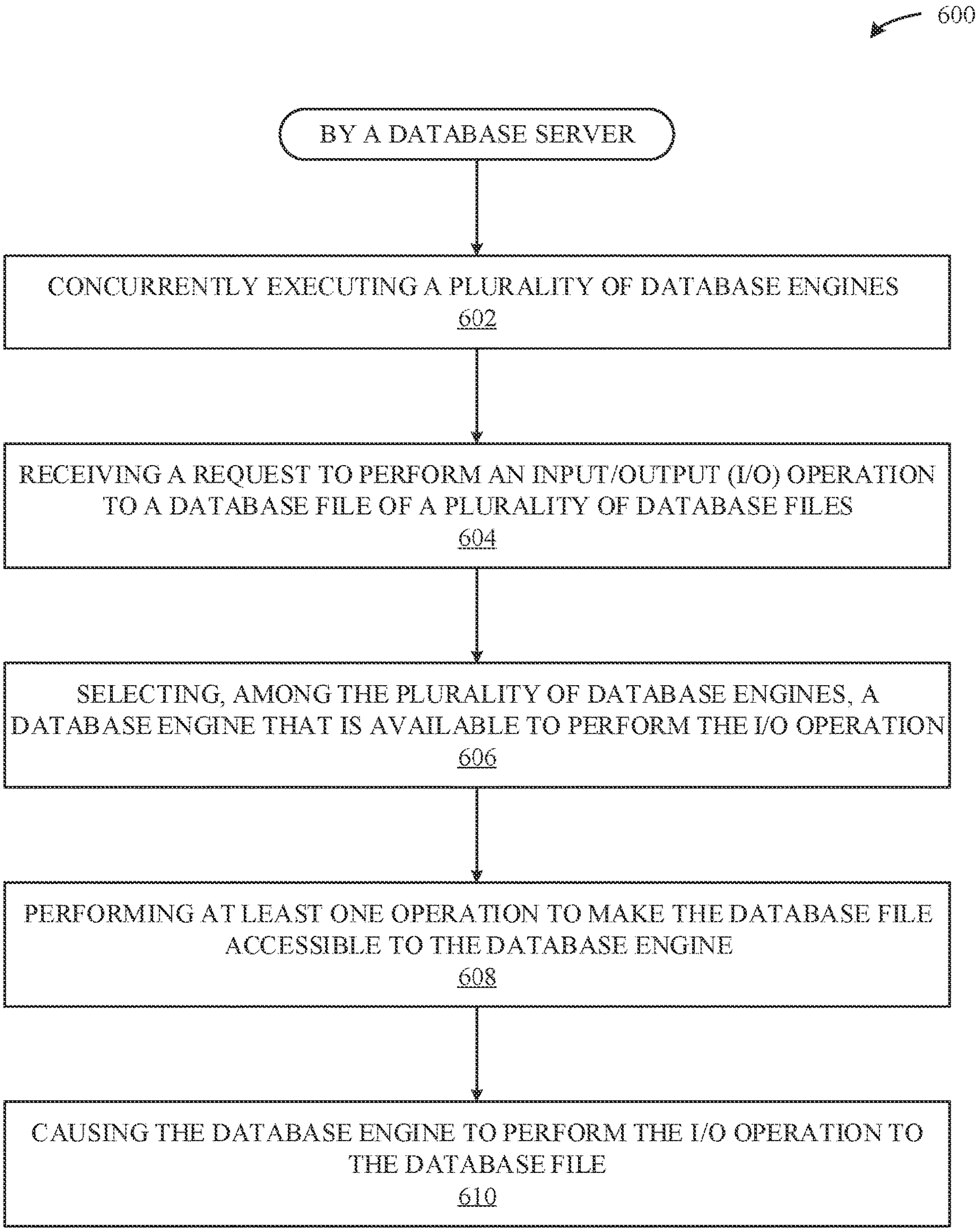
FIG. 6 illustrates a method for managing a plurality of database engines, according to some embodiments.

FIG. 6 illustrates a method 600 for managing a plurality of database engines, according to some embodiments. As shown in FIG. 6, the method 600 begins at step 602, where the database server 114 concurrently executes a plurality of database engines. At step 604, the database server 114 receives a request to perform an input/output (I/O) operation to a database file of a plurality of database files. At step 606, the database server 114 selects, among the plurality of database engines, a database engine that is available to perform the I/O operation. At step 608, the database server 114 performs at least one operation to make the database file accessible to the database engine. At step 610, the database server 114 causes the database engine to perform the I/O operation to the database file.

Figure 7:
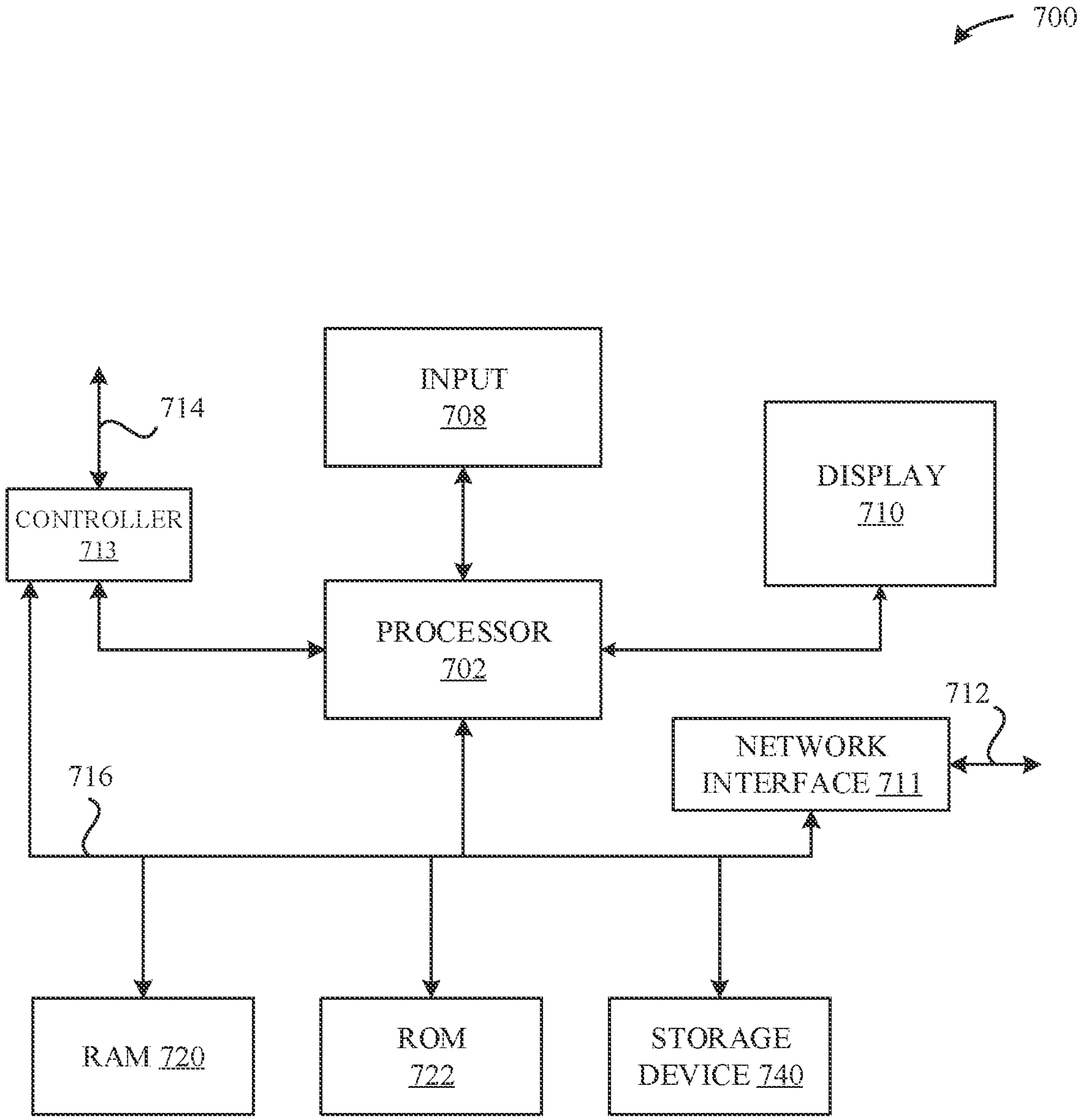
FIG. 7 illustrates a detailed view of a computing device that can be used to implement the various techniques described herein, according to some embodiments.

FIG. 7 illustrates a detailed view of a computing device 700 that can be used to implement the various techniques described herein, according to some embodiments. In particular, the detailed view illustrates various components that can be included in any of the computing devices described above in conjunction with FIG. 1. As shown in FIG. 7, the computing device 700 can include a processor 702 that represents a microprocessor or controller for controlling the overall operation of the computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, and so on. Still further, the computing device 700 can include a display 710 that can be controlled by the processor

702 (e.g., via a graphics component) to display information to the user. A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include a wireless transceiver.

As noted above, the computing device 700 also includes the storage device 740, which can comprise a single disk or a collection of disks (e.g., hard drives). In some embodiments, storage device 740 can include flash memory, semiconductor (solid-state) memory or the like. The computing device 700 can also include a Random-Access Memory (RAM) 720 and a Read-Only Memory (ROM) 722. The ROM 722 can store programs, utilities, or processes to be executed in a non-volatile manner. The RAM 720 can provide volatile data storage, and stores instructions related to the operation of applications executing on the computing device 700.

The various aspects, embodiments, implementations, or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

The terms "a," "an," "the," and "said" as used herein in connection with any type of processing component configured to perform various functions may refer to one processing component configured to perform each and every function, or a plurality of processing components collectively configured to perform the various functions. By way of example, "A processor" configured to perform actions A, B, and C may refer to one or more processors configured to perform actions A, B, and C. In addition, "A processor" configured to perform actions A, B, and C may also refer to a first processor configured to perform actions A and B, and a second processor configured to perform action C. Further, "A processor" configured to perform actions A, B, and C may also refer to a first processor configured to perform action A, a second processor configured to perform action B, and a third processor configured to perform action C.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As described herein, one aspect of the present technology is the gathering and use of data available from various sources to improve user experiences. The present disclosure contemplates that in some instances, this gathered data may include personal information data that uniquely identifies or can be used to contact or locate a specific person. Such personal information data can include demographics data, location-based data, telephone numbers, email addresses, home addresses, data or records relating to a user's health or level of fitness (e.g., vital signs measurements, medication information, exercise information), date of birth, smart home activity, or any other identifying or personal information. The present disclosure recognizes that the use of such personal information data, in the present technology, can be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select to provide only certain types of data that contribute to the techniques described herein. In addition to providing "opt in" and "opt out" options, the present disclosure contemplates providing notifications relating to the access or use of personal information. For instance, a user may be notified that their personal information data may be accessed and then reminded again just before personal information data is accessed.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method for managing a plurality of database engines, the method comprising, by a database server:

concurrently executing the plurality of database engines; and in response to receiving a request, from a routing server, to perform an input/output operation to a database file of a plurality of database files, wherein the request is provided to the database server based on a hash of a user ID and a count of a group of database servers identified as capable of accessing the database file:

selecting, among the plurality of database engines, a database engine that is available to perform the input/output operation;

performing at least one operation to make the database file accessible to the database engine;

obtaining an exclusive lock on the database file, wherein obtaining the exclusive lock comprises updating metadata associated with the database file in response to determining that the exclusive lock is obtained, and wherein, in response to determining that the exclusive lock is not obtained, the method further comprises extracting, from the metadata, information about a different database server that has obtained the exclusive lock on the database file, and then providing the information to the routing server;

in response to determining that the exclusive lock is obtained, causing the database engine to perform the input/output operation to the database file; and in response to determining that the exclusive lock is obtained, providing, to the routing server, a response in accordance with the input/output operation.

2. The method of claim 1, wherein:

the database file is encrypted by an encryption key that is associated with the database file and a corresponding user account; and the at least one operation comprises decrypting the database file using the encryption key.

3. The method of claim 1, further comprising increasing or decreasing a number of the plurality of database engines executing on the database server in correlation to a rate at which input/output operations are received by the database server.

4. The method of claim 1, wherein the database file corresponds to a respective user account such that data associated with the respective user account is isolated from data of other user accounts stored in other database files of the plurality of database files.

5. The method of claim 1, wherein:

a journal is managed for the database file; and the method further comprises updating the respective journal for the database file, based on the input/output operation.

6. The method of claim 1, wherein the input/output operation involves at least one read operation or at least one write operation to the database file.

7. The method of claim 2, wherein the encryption key is received in conjunction with the request.

8. The method of claim 2, further including responsive to receiving an indication that access to the database file is no longer required, performing at least one additional operation to re-encrypt the database file.

9. A non-transitory computer readable storage medium configured to store instructions that, when executed by at least one processor included in a database server, cause the database server to manage a plurality of database engines, by carrying out steps that include:

concurrently executing the plurality of database engines; and in response to receiving a request, from a routing server, to perform an input/output operation to a database file of a plurality of database files, wherein the request is provided to the database server based on a hash of a user ID and a count of a group of database servers identified as capable of accessing the database file:

selecting, among the plurality of database engines, a database engine that is available to perform the input/output operation;

performing at least one operation to make the database file accessible to the database engine;

obtaining an exclusive lock on the database file, wherein obtaining the exclusive lock comprises updating metadata associated with the database file in response to determining that the exclusive lock is obtained, and wherein, in response to determining that the exclusive lock is not obtained, the steps further include extracting, from the metadata, information about a different database server that has obtained the exclusive lock on the database file, and then providing the information to the routing server;

in response to determining that the exclusive lock is obtained, causing the database engine to perform the input/output operation to the database file; and in response to determining that the exclusive lock is obtained, providing, to the routing server, a response in accordance with the input/output operation.

10. The non-transitory computer readable storage medium of claim 8, wherein:

the database file is encrypted by an encryption key that is associated with the database file and a corresponding user account; and the at least one operation comprises decrypting the database file using the encryption key.

11. The non-transitory computer readable storage medium of claim 8, wherein the steps further include increasing or decreasing a number of the plurality of database engines executing on the database server in correlation to a rate at which input/output operations are received by the database server.

12. The non-transitory computer readable storage medium of claim 8, wherein the database file corresponds to a respective user account such that data associated with the respective user account is isolated from data of other user accounts stored in other database files of the plurality of database files.

13. The non-transitory computer readable storage medium of claim 8, wherein:

a journal is managed for the database file; and the steps further include updating the respective journal for the database file based on the input/output operation.

14. The non-transitory computer readable storage medium of claim 8, wherein the input/output operation involves at least one read operation or at least one write operation to the database file.

15. A database server configured to manage a plurality of database engines, the database server comprising at least one processor configured to cause the database server to carry out steps that include:

concurrently executing the plurality of database engines; and in response to receiving a request, from a routing server, to perform an input/output operation to a database file of a plurality of database files, wherein the request is provided to the database server based on a hash of a user ID and a count of a group of database servers identified as capable of accessing the database file:

selecting, among the plurality of database engines, a database engine that is available to perform the input/output operation;

performing at least one operation to make the database file accessible to the database engine;

obtaining an exclusive lock on the database file, wherein obtaining the exclusive lock comprises updating metadata associated with the database file in response to determining that the exclusive lock is obtained, and wherein, in response to determining that the exclusive lock is not obtained, the steps further include extracting, from the metadata, information about a different database server that has obtained the exclusive lock on the database file, and then providing the information to the routing server;

in response to determining that the exclusive lock is obtained, causing the database engine to perform the input/output operation to the database file; and in response to determining that the exclusive lock is obtained, providing, to the routing server, a response in accordance with the input/output operation.

16. The database server of claim 15, wherein:

the database file is encrypted by an encryption key that is associated with the database file and a corresponding user account; and the at least one operation comprises decrypting the database file using the encryption key.

17. The database server of claim 16, wherein the steps further include, responsive to receiving an indication that access to the database file is no longer required, performing at least one additional operation to re-encrypt the database file.

18. The database server of claim 15, wherein the steps further include increasing or decreasing a number of the plurality of database engines executing on the database server in correlation to a rate at which input/output operations are received by the database server.

19. The database server of claim 15, wherein the database file corresponds to a respective user account such that data associated with the respective user account is isolated from data of other user accounts stored in other database files of the plurality of database files.

20. The database server of claim 15, wherein:

a journal is managed for the database file; and the steps further include updating the respective journal for the database file based on the input/output operation.

* * * * *